United States Patent [19]

Davis et al.

[11] Patent Number: 4,799,763
[45] Date of Patent: Jan. 24, 1989

[54] PARAXIAL STEREOSCOPIC PROJECTION SYSTEM

[75] Inventors: John R. Davis, Dublin; Marlin O. Thurston, Columbus, both of Ohio

[73] Assignee: Canaby Technologies Corporation, Columbus, Ohio

[21] Appl. No.: 31,529

[22] Filed: Mar. 27, 1987

[51] Int. Cl.⁴ .................... G02B 27/24; G02B 17/06; G02B 27/10
[52] U.S. Cl. .................... 350/137; 350/138; 350/143; 358/88; 358/238; 358/3; 353/3
[58] Field of Search ............ 350/130, 131, 137, 138, 350/602, 622; 358/88, 91, 237, 238, 3; 353/7, 10; 352/57, 63

[56] References Cited

U.S. PATENT DOCUMENTS 4,549,208 10/1986 Kamejima et al. ............... 358/108
4,623,223 11/1986 Kempf ............................. 350/137

*Primary Examiner*—Jon W. Henry
*Attorney, Agent, or Firm*—Mueller and Smith

[57] ABSTRACT

Disclosed is a stereoscopic projection system for viewing from an eye station a stereoscopic image composed of a 1 x magnification of an image source pair. Said system comprises a pair of image sources each having an image center which are spaced apart from each other; a concave spherical mirror segment having a center of curvature and located between said image source pair and said viewable stereoscopic image. The concave spherical mirror is disposed so that the image centers of said image source pair and said viewable stereoscopic image are located at said center of curvature. Image deflecting means are disposed between its image source and said spherical mirror about the juncture whereat the aperture of the system is the smallest so that the image center of each of said image sources are located in spaced apart relationship. Finally, a beam splitter is interposed to reflect image projection between said deflecting means and said spherical mirror and to pass image projection between said spherical mirror and said eye station.

13 Claims, 4 Drawing Sheets

PARAXIAL STEREOSCOPIC PROJECTION SYSTEM

BACKGROUND OF THE INVENTION

The present invention relates to stereoscopic projection systems and more particularly to a relatively distortion-free, "on axis" system which does not require the user to wear eyeglasses or utilize other means to separate the images. As used herein with respect to the present system, "on axis" means that the optical axes of both viewable images are optical axes of the spherical mirror and the centers of both images are located at the center of curvature of the spherical mirror.

Most conventional stereoscopic projection systems rely on various chromatic phenomena, polarization techniques, or like restrictions which are placed on the user. Use of eyewear containing such modifications limits the practicality of the system since it is difficult for the user's eyes to accommodate when attention must be devoted at a location in the room away from the stereoscopic image being viewed. Moreover, such eyewear is inconvenient to the user and contributes to the cost of the system.

Nevertheless, for many purposes, stereoscopic projection systems provide real advantages. Stereotactic neurosurgery could be enhanced, for example, if computer assisted X-ray tomography images or nuclear magnetic resonance images could be processed in a computer and a composite of the brain projected as a stereo image. Relating this information on the location of brain tumors to the patient during surgery could be materially advanced by such a stereoscopic projection system. In fact, a non-distorted stereoscopic projection system in the operating room would be of even further benefit. Of course, other uses of a stereoscopic projection system outside of the medical field also can be readily envisioned. For example, in the aerodynamic design of surfaces (automobiles or aircraft) stereoscopic projection of the object being designed would be of benefit to the designer.

Prior proposals aimed at improving stereoscopic projection systems include U.S. Pats. Nos. 4,322,743 and 4,535,354. These systems, however, are not on axis and, therefore, exhibit unacceptable distortion patterns. Other proposals include U.S. Pats. Nos. 2,783,406 and 3,046,330. Despite these proposals, improved systems still are desired in this field.

BROAD STATEMENT OF THE INVENTION

The present invention is directed to a stereoscopic projection system for viewing from an eye station a stereoscopic image composed of a 1X magnification of an image source pair. Such system comprises a pair of image sources each having an image center which are spaced-apart from each other. A concave spherical mirror segment having a center of curvature is located between the image source pair and the viewable stereoscopic image. The concave spherical mirror segment is disposed so that the image centers of the image source pair and the viewable stereoscopic image are located at the center of curvature of such mirror segment. Image deflecting means are disposed between each image source and the spherical mirror about the juncture whereat the aperture of the system is the smallest. This enables the image center of each of the image sources and of the viewable stereoscopic image to be located in spaced-apart relationship. Finally, beam splitter means is interposed to reflect image projection between the deflecting means and the spherical mirror, and to pass image projection between the spherical mirror and the eye station.

Advantages of the present invention include an "on axis" system which is relatively free of distortion. A further advantage of the present invention is that the barrel distortion which does exist is the same for each image presented to each eye and is constant regardless of eye position, thus enabling its correction at the image source. Another advantage is a stereoscopic projection system which does not require the user to wear eyeglasses or other paraphernalia. Yet another advantage is a stereoscopic projection system which can be readily and economically manufactured, even in the form of a convenient CRT or video work station. These and other advantages will be readily apparent to those skilled in the art based upon the disclosure contained herein.

The drawings will be described in detail in connection with the description which follows.

DETAILED DESCRIPTION OF THE INVENTION

In stereoscopic vision, each eye presents a two-dimensional image of the object, from slightly different viewpoints, to the brain where the images are combined into a single three-dimensional image. In order to simulate stereoscopic vision of an object (image source), a stereoscopic viewing system must be arranged such that a two-dimensional image of the image source is presented separately to each eye. Each image of the image source must be from the viewpoint of the corresponding eye and in focus at the apparent distance of the image from the eyes. The centers of the two images also should be coincident at the apparent distance of the image source from the eyes. This requires an optical system for each eye which forms a image of the image source at the apparent distance of the image source from each eye. The center lines of the two optical systems must cross at the apparent distance of the image source from the eyes and the field of view must be limited for each eye so as not to overlap that field of view of the adjacent eye. If the foregoing objects are met, then the resulting stereoscopic projection system will not require the user to wear special glasses which contain polarization, color filters, a dividing wall between each eye, or like artificial means.

Due to the narrow convergence angle required for comfortable viewing distances (e.g. about 5° for a 36" viewing distance), the optical elements and the image sources of the two optical systems physically will overlap except for extremely long focal length optical elements. Extremely long focal length optical elements are impractical in most commercial settings, especially if a work station dimension stereoscopic projection system is desired. The physical conflict between the optical elements of the two optical systems required for stereoscopic vision can be eliminated if a single optical element is shared by both of the optical systems. One of the discoveries of the present invention is that such a single optical element comprises a concave spherical mirror wherein the image source and the viewable image of both optical systems are centered at the radius of curvature of the concave spherical mirror. This discovery is set forth diagrammatically at FIG. 1 which depicts in ray tracing format the aperture of each optical system which share a common concave spherical mirror.

Figure 1:
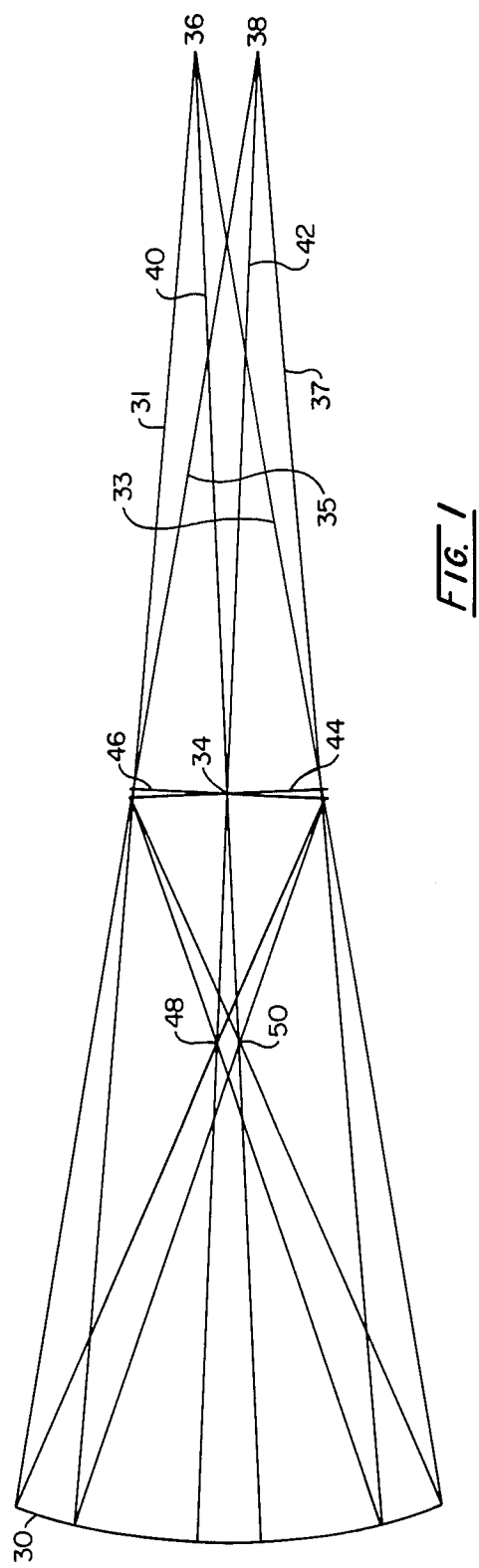
FIG. 1 depicts the aperture of the inventive optical system which shares a common concave spherical mirror.

Referring to FIG. 1 in more detail, spherical mirror segment 30 is spaced apart from image sources 44 and 46 at a suitable distance so that the image center of image sources 44 and 46 also are at the center of curvature of spherical mirror 30, this point being represented at 34. Positions 36 and 38 represent eyes which form an eye station with rays 40 and 42 from eyes 36 and 38, respectively, forming the convergence angle through point 34, the center of images source 44 and 46. Lines of sight 31 and 33 represent the aperture of the system for eye station 36 and lines of sight 35 and 37 represent the aperture of the system for eye station 38. Also, since both the images and image sources have their centers at point 34, the image and image source for each eye station essentially are coincident and are represented as 44 and 46.

Now, image 44 would be presented to an eye located at station 36 and image 46 would be presented to an eye located at station 38. Images 44 and 46 also have their image centers located at 34, the center of curvature of spherical mirror segment 30. The convergence angle for of images 44 and 46 is slightly increased in FIG. 1 in order to enhance understanding of the pair of two-dimensional images of image sources 44 and 46 which are presented to stations 36 and 38, respectively. Of importance is the fact that an eye located at station 36 would not be able to view image 46 nor would an eye located at station 38 be able to view image 44.

One result from placing the image source and the image both at center of curvature 34 of spherical mirror segment 30 is that all rays passing through the center of the image to the mirror become optical axes. This means that the eye sees a spherical surface that is always the same no matter where the eye is moved in space. Thus, wherever the eye is moved, the center of both images always is on a central ray which is different for each station 36 and 38 and, the stereoscopic projection system is "on axis" of paraxial with respect to spherical mirror segment 30, and a single optical element can be used for both optical pathways. Another result of the system configuration is that the image and image source are the same size, i.e. a 1X magnification system.

A consequence of the arrangement set forth at FIG. 1, however, is that the image source and the viewable image (i.e. images 44 and 46) overlap. It will be observed, though, that the aperture of each optical pathway becomes quite small at location 48 and location 50 for stations 38 and 36, respectively. This small aperture of the optical system occurs at a juncture located between image sources 44 and 46, and spherical mirror segment 30. In order to appreciate this narrow aperture feature of the optical system, further reference is made to FIGS. 2 and 3.

Figure 2:
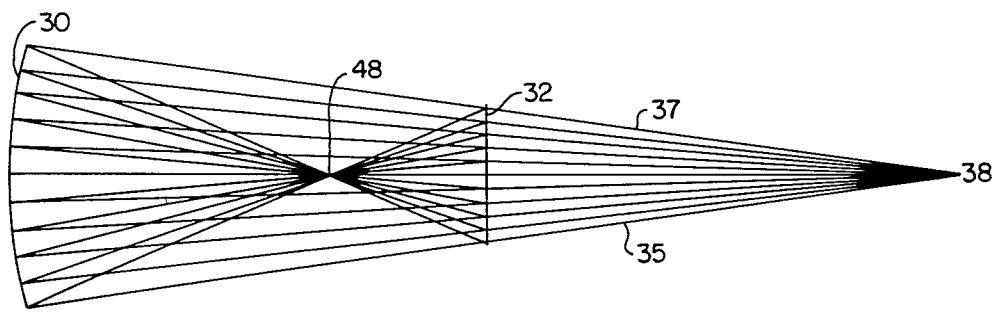
FIG. 2 is a more detailed representation of the optical system associated with eye station 36 with computerized ray tracing enhancement.

FIG. 2 is appropriate for eye station 38 only, though it holds equally true for eye station 38. Accurate illustration of the principle involved, however, is more meaningful if only one of the optical pathways is depicted. The optical system depicted at FIG. 2 shows the aperture of the system as well as several rays in computerized ray tracing format. When juncture 48 is magnified, the ray tracing of the optical system becomes as set forth at FIG. 3. A locus of rays define narrowest aperture 48 of the optical system for eye station 38 and image source 46. This small aperture means that a small mirror can be interposed in the optical pathway about the minimum aperture 52 without affecting the optical pathway so as to separate out the image source and the image. In practical terms, this translates into the ability to interpose this small reflecting surface from about position 54 to about position 56 and still be able to deflect or reflect all the rays constituting the image passing therethrough. In order to appreciate the magnitude of minimum aperture location 48, for an optical system wherein the radius of curvature of spherical mirror segment 30 is 36 inches, the distance between locations 54 and 56 is about 1.5 inches and distance between locations 48 and 50 is about one inch.

Figure 3:
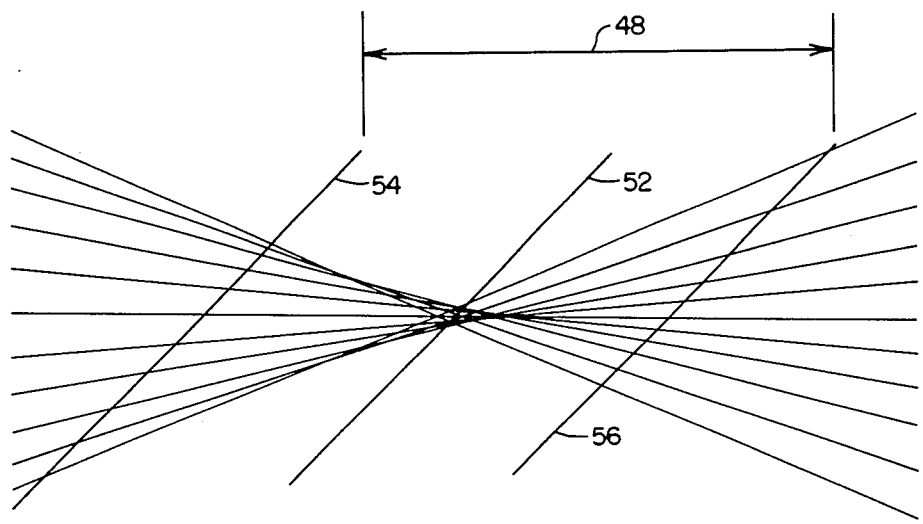
FIG. 3 is a magnified view of the location of narrowest aperture of the optical system of FIG. 2.
Figure 4:
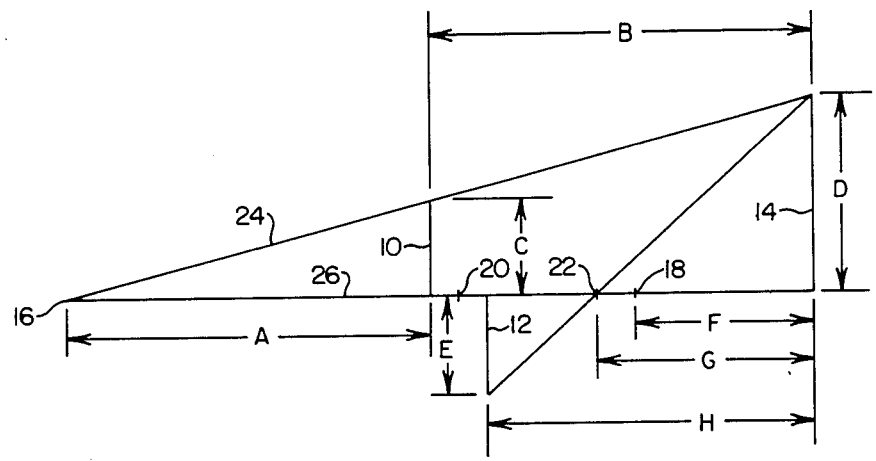
FIG. 4 is a simplified representation of an optical system, such as for the present invention, which is used for clarity in setting forth the inventive stereoscopic projection system.

Continuing further with the location of the minimum aperture of the system which enables the image sources to be separated from the image pair, reference is made to FIG. 4 which is a simplified representation of one of the optical pathways set forth at FIGS. 1-3. The following table defines the optical system set forth at FIG. 4:

TABLE 1

A. Viewing distance from eye station 16 to image 10,
B. Image distance from image 10 to concave spherical mirror segment 14,
C. The height of image source (object) 12,
D. The projection of the height of image source 12 onto concave spherical mirror segment 14,
E. The height of image 10,
F. The focal length of concave spherical mirror segment 14 (i.e. the distance from focal point 18 to concave spherical mirror segment 14),
G. The distance from the point of narrowest aperture 22 to concave spherical mirror 14, and
H. The object distance from image source 12 to concave spherical mirror 14.

The following mathematical equations are appropriate for the simplified optical system as defined in FIG. 4:

$$\frac{1}{F} = \frac{1}{B} + \frac{1}{H}, \text{ Gaussian form of the "lens formula"}, \quad (1)$$

$$\frac{E}{C} = \frac{H}{B}, \text{ magnification or conjugate ratio}, \quad (2)$$

$$\frac{C}{D} = \frac{A}{A + B}, \text{ similar triangle relationship}, \quad (3)$$

$$\frac{E}{D} = \frac{H - G}{G}, \text{ similar triangle relationship}. \quad (4)$$

Now, in order to determine the location of narrowest aperture 22, it is desirable to determine G/H as a function of A, B, and F. The following generalized equation sets forth such relationship:

$$\frac{G}{H} = \frac{1}{1 + \frac{AF}{(A+B)(B-F)}} \quad (5)$$

Now, for an optical system where image 10 and image source 12 are both located at center of curvature 20 of spherical mirror segment 14 (i.e. A=B), the following relationships must be true:

A=B=2F, and C=E (i.e. a 1X magnification system)  (6)

Making the appropriate substitution based on equation (6), the simplified formula for locating narrowest aperture 22 results in equation (5) being as follows;

$$\frac{G}{H} = \frac{2}{3} \quad (7)$$

Interestingly for the simplified formula of the optical system of the present invention, the location of narrowest aperture 22 (locations 48 and 50 of FIG. 1) is approximately a constant. Based on computerized ray tracings, the location of narrowest aperture is within about 0.5 inch from the location identified by equation 7 for a 36" radius of curvature spherical mirror system.

An optical system, designed as set forth at FIG. 1, necessarily implies that the center of curvature of spherical mirror 30 (or 14) and the convergence point are the same. Also, the image and the image source both have their centers at the center of curvature 34 of spherical mirror segment 30 (FIG. 1) and their optical axes coincide with the optical axes of spherical mirror 30 independent of eye position. This means that the distortion will be the same for both images 44 and 46 (FIG. 1). The only way by which such congruent image distortion is realized is for an optical system which is "on axis".

Dealing with the expected aberrations in the system in more detail, third order aberrations are known as the Seidel aberrations which are: chromatic aberration, spherical aberration, astigmatism, coma, and distortion. The optical system of the present invention does not present any chromatic aberration nor astigmatism. Spherical aberration is not a problem since the optical system utilizes a spherical mirror in its natural mode. Also, coma is not a problem because of the large depth of focus of the optical system. Distortion is defined as a change in magnification as a function of the distance away from the axis. Accordingly, at the periphery of the image, some barrel distortion exists, though such distortion is the same for each image presented to each eye station. Also, such distortion is constant regardless of eye position. Since the barrel distortion is the same for each image and constant regardless of eye position, correction of the barrel distortion can be implemented at the image sources. For an "off axis" system, the distortion varies with eye position so correction at the image source is not possible.

Interposing small plano mirrors, or conveniently a silvered (i.e. reflective) prism, at junctures 48 and 50 (FIG. 1) separates out the image from the image source. Next, the system must be able to remove junctures 48 and 50 from the aperture of the system. This is necessary since mirrors disposed at junctures 48 and 50 would interfere with images 46 and 44 being reflected from spherical mirror segment 30. The solution to this problem and a practical design for a stereoscopic projection system constructed in accordance with the precepts of the present invention is set forth at FIGS. 5-7.

Figure 5:
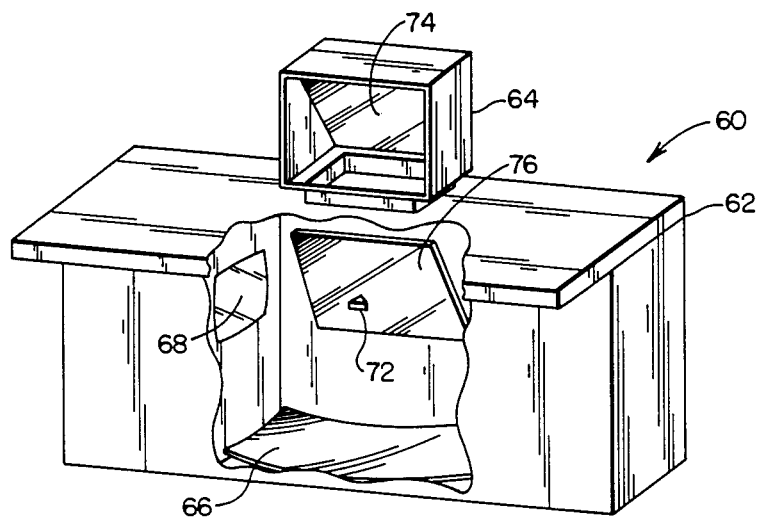
FIG. 5 is a perspective view of a work station with partial cut-away exposing the optical elements of the stereoscopic projection system of the present invention.

Referring to FIG. 5 in more detail, presented is work station 60 composed of desk unit 62 and viewing cabinet 64. The optical elements contained within work station 60 are shown in their spatial relationship. Mounting brackets and other hardware are not shown in order to clearly illustrate the optical path and optical element interrelationship created for implementation of the inventive stereoscopic projection system. The optical system is comprised of concave spherical mirror segment 66, monitors 68 and 70 (see FIG. 7) which comprise the image source, and silvered prism 72 which is interposed at apertures 48 and 50 (FIG. 1). Plano mirror 74 merely turns the image so that a person can be seated before work station 60 for viewing the stereoscopic image. Plano mirror 74, thus, is not required for generating the stereoscopic image of the present invention.

Now, prism 72 has been removed from the aperture of the optical path between spherical mirror segment 66 and the stereoscopic image (e.g. plano mirror 74 which bears the image) by utilization of beam splitter 76. Beam splitter 76 is appropriately coated so that image projection is reflected from each of the two mirrored faces of prism 72 and thence into spherical mirror segment 66, but passes image projection between spherical mirror segment 66 and plano mirror 74. This, perhaps, can be better understood by reference to FIG. 6 which shows the reflectance/passing properties of beam splitter 76. Accordingly, monitors 68 and 70 display an image projection which strikes the small mirrored surfaces of prism 72 which image projection then is reflected off of beam splitter 76 onto spherical mirror segment 66. Image projection from spherical mirror segment 66 then passes through beam splitter 76 into plano mirror 74 and thence to eye station 78 composed of individual eye locations 80 and 82 which suitably are the eyes of a person seated at the work station 60. Both images share spherical mirror segment 66 and a single beam splitter in the optical path. Images projected from monitors 68 and 70 can be derived from video cameras suitably photographing a scene, or can be images generated within a computer. In fact, the barrel distortion resulting from the optical system can be corrected in the computer if computer-generated images are being fed to monitors 68 and 70. This barrel distortion also may be corrected by introducing pin cushion distortion in monitors 68 and 70. Of course, it will be appreciated that a pair of small mirrors could replace right angle prism 72.

Figure 6:
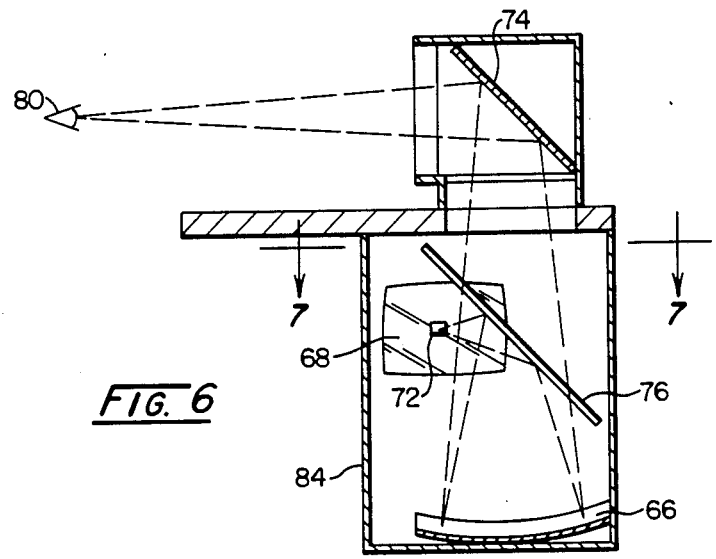
FIG. 6 is a cross-sectional elevational view of the work station of FIG. 5.
Figure 7:
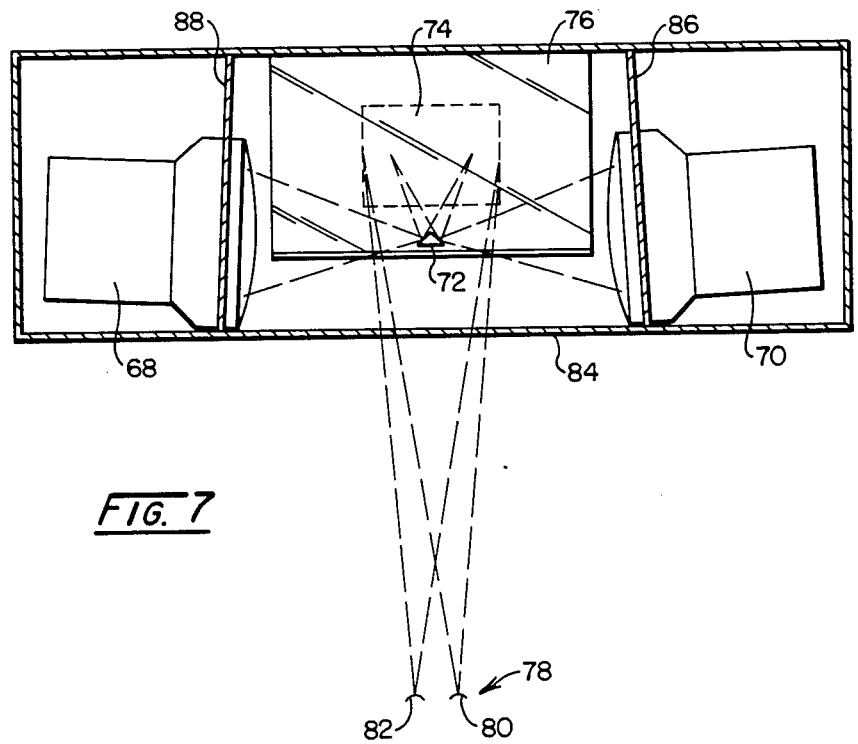
FIG. 7 is an overhead cross-sectional elevational view of the work station of FIG. 5.

With respect to the physical layout of the stereo workstation shown at FIGS. 5-7, the following discussion obtains for a prototype system utilizing a 36 inch radius of curvature spherical mirror segment with a 72 inch viewing distance between the spherical mirror segment and the eye station. Spherical mirror segment 66 is about 24"×18" in dimension and is supported at its lower surface by three support brackets on about a 16 inch circular pathway. Such support provides about equal weight distribution within such circular pathway and without such circular pathway. A support column is disposed adjacent front wall 84 of desk unit 62 and just opposite prism 72. A mounting arm, desirably with pivotal movement, extends generally posteriorly from the support column to prism 72 for its mounting. Beam splitter 76 also preferably is mounted off of such column with a posterior arm extending to the upper center periphery thereof. Laterally disposed mounting brackets then may project from the lower corners of beam splitter 76 to interior walls 86 and 88. The foregoing mounting arrangement does not interfere with any optical pathway of the system. Of course, viewing cabinet 64 should have a front dust plate thereon and the interior space bearing the optical elements should be sealed so that it is dust-free. Beam splitter 76 may be trapezoidal in shape with a height of about 19.5 inches, a top measurement of about 15.25 inches, and a bottom measurement of about 21.25 inches for the noted system. The distance between the center of spherical mirror segment 66 and the center of beam splitter 76 is about 16 inches and the prism is located at about 8 inches from the center of beam splitter 76. The system as designed presents the image at the center of plano mirror 74 which is designed to be a comfortable, 36 inch viewing distance.

Since an odd number of reflecting surfaces comprise the system as depicted at FIGS. 5-7, the image presented to eye station 78 is the reverse of the image projected from monitors 68 and 70. Correction can be added in the computer controlling image projection from the monitors, the monitor hardware can be altered, or another scheme similarly implemented to present a non-reversed image to eye station 78. As noted above, correction of the slight barrel distortion additionally can be implemented in the computer controlling the image, or by the introduction of pin cushion distortion in monitors 68 and 70. Optical correction of such barrel distortion also can be implemented by the use of a corrector plate which can be located conveniently between the monitors and the prism, or elsewhere. Such corrector plate conceivably could take the form of a lens. It is important to note that when additional optical elements are interposed in the image projection path, risk of introduction of additional distortion is present. That is, if magnification were introduced in the image projection path so that the image source and image were not the same size, distortion has been introduced into the system. For some purposes, though, the introduction of additional distortion might be tolerated. In this regard, while the invention has been illustrated by specific reference to monitors comprising the image sources, it will be realized that the image sources could comprise real or virtual image production from another optical system. Thus, the use of transparencies or film negatives, film positives, and the like should be considered suitable for use as the image source for the stereoscopic projection system of the present invention. With this new powerful tool available, a variety of applications which have not been traditionally associated with stereoscopic projection systems now can be addressed. For example, the depth of focus of the inventive stereoscopic projection system is such that depth or height measurement determinations become visible, as does use of the system in pattern recognition applications. Remote pointing or location determination also becomes viable, for example, by use of two cameras operating in real time. Qualitative depth determination during the location determination procedure could be accomplished by changing the convergence angle of the cameras. Quantitative determination could be implemented by calibrating the convergence angle of the cameras to the distance of an object from such cameras. The foregoing are but a few of the myriad of new applications which are now available for consideration by virtue of the inventive stereoscopic projection system.

We claim:

1. A stereoscopic projection system for viewing from an eye station a stereoscopic image comprising:
   a pair of image sources each having an image center which are spaced-apart from each other;
   a concave spherical mirror segment having a center of curvature and located between said image source pair and said viewable stereoscopic image which also has an image center, and being disposed so that said image centers of said image source pair and said viewable stereoscopic image are located at said center of curvature;
   image deflecting means disposed between each image source and said spherical mirror about the juncture whereat the aperture of the system is the smallest so that the image center of each of said image sources are located in spaced-apart relationship; and
   beam splitter means interposed to reflect image projection between said deflecting means and said spherical mirror and to pass image projection between said spherical mirror and said eye station.

2. The stereoscopic projection system of claim 1 wherein said image deflecting means comprises an image deflecting prism.

3. The stereoscopic projection system of claim 1 wherein each image source comprises a video monitor.

4. The stereoscopic projection system of claim 1 wherein said stereoscopic image comprises a one times magnification of said image source pair.

5. A method for projecting a stereoscopic image for viewing from an eye station wherein said image comprises an image source pair, which comprises:
   providing a pair of image sources each having an image center which are spaced apart from each other;
   locating a concave spherical mirror segment having a center of curvature between said image source pair and said viewable stereoscopic image which also has an image center, said mirror segment being disposed so that said image centers of said image source pair and said viewable stereoscopic image are located at said center of curvature;
   disposing image deflecting means between each image source and said spherical mirror about the juncture whereat the aperture of the system is the smallest so that the image center of each of said image sources are located in spaced-apart relationship; and
   interposing beam splitter means to reflect image projection between said deflecting means and said spherical mirror and to pass image projection between said spherical mirror and said eye station.

6. The method of claim 5 wherein said disposed image deflecting means comprises image deflecting prism.

7. The method of claim 5 wherein each image source comprises a video monitor.

8. The method of claim 5 wherein said stereoscopic image comprises a one times magnification of said image source pair.

9. The method of claim 5 wherein barrel distortion in said stereoscopic image is corrected at said image source pair.

10. The method of claim 9 wherein said correction is accomplished in a computer which generates said image source pair.

11. The method of claim 7 wherein barrel distortion in said stereoscopic image is corrected by introducing pin cushion distortion in said video monitors.

12. The method of claim 9 wherein said correction comprises the interposition of an optical corrector plate in the path of said image projection.

13. The method of claim 5 wherein said image source pair are derived from computer assisted X-ray tomagraphy images or nuclear magnetic resonance images

* * * * *